UNITED STATES PATENT OFFICE.

ALBRECHT SCHMIDT, OF BERLIN, GERMANY, ASSIGNOR TO THE CHEMISCHE FABRIK AUF AKTIEN, VORMALS E. SCHERING, OF SAME PLACE, AND THE FARBENFABRIKEN, VORMALS FR. BAYER & CO., OF ELBERFELD, GERMANY.

CITRATE OF ETHENYLETHYLENAMIDIN AND PROCESS OF OBTAINING SAME.

SPECIFICATION forming part of Letters Patent No. 544,933, dated August 20, 1895.

Application filed December 18, 1894. Serial No. 532,236. (Specimens.)

*To all whom it may concern:*

Be it known that I, ALBRECHT SCHMIDT, chemist, doctor of philosophy, a subject of the Emperor of Germany, residing at Berlin, Prussia, Germany, have invented a new and useful Improvement in the Manufacture of Pharmaceutical Products; and I do hereby declare the following to be an exact and clear description of my invention.

My invention relates to the production of a valuable pharmaceutical product which consists in combining in equimolecular proportions the so-called ethenylethylenamidin $C_2H_4N_2H.C.CH_3$ with organic acids, especially salicylic acid or citric acid. The aforesaid ethenylethylenamidin has been first obtained by Hofmann (see *Berichte der Deutschen Chemischen Gesellschaft*, volume 21, page 2,332) by heating diacetethylendiamin in a current of hydrochloric gas, and the same compound has been prepared later on by Ladenburg (see *Berichte der Deutschen Chemischen Gesellschaft*, volume 27, page 2,952) by distilling a mixture prepared from one molecular proportion of ethylendiaminchlorhydrate and two molecular proportions of sodium acetate. The base thus obtained melts at 105° centigrade and shows the valuable property of forming with uric acid a crystalline salt very readily soluble in water. Owing to this fact the employment of this base as a remedy in cases of uric-acid concretion, rheumatism, or the like is indicated. According to my researches, however, the use of the base itself is in many respects detrimental for the organism, as the base when introduced into the stomach affects the same in a high degree. Now, I have found that certain organic salts of the above base, especially the salicylic acid and the citric-acid salt, are destitute of any detrimental effect, and likewise possess when decomposed in the organism the valuable property of dissolving uric acid or the like. I therefore propose to use these salts as remedies in cases of uric-acid concretions, rheumatism, or the like.

In carrying out my invention practically I can proceed as follows:

Example: Equimolecular proportions of citric acid and ethenylethylenamidin are dissolved in a small quantity of alcohol. The combination of these two components being complete ether is added to the alcoholic solution in order to precipitate the citric salt which is precipitated as a resinous mass. It is purified by redissolving in hot absolute alcohol and crystallization. The citric salt forms a white crystalline powder soluble in water and possesses the following formula:

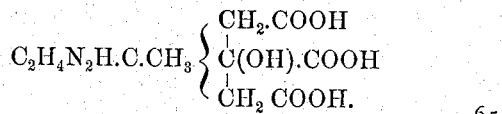

Instead of alcohol other suitable solvents may be employed in the above process.

The aforesaid salts of ethenylethylenamidin represent valuable medicinal products, which can be employed in all such cases in which piperazin or salts thereof may be employed, especially in cases of rheumatism, uric-acid concretions, and so on.

The dose is, according to the condition of the patient, from one to five grains a day.

The aforesaid salts are superior to piperazin or similar products by their greater capability of dissolving uric acid.

When in the claims of this application I refer to citric acid I mean to include therein and as an equivalent thereof salicylic acid.

Having now described my invention and in what manner the same is to be performed, what I claim as new, and desire to secure by Letters Patent, is—

1. The process of producing a new pharmaceutical product, which consists in combining equi-molecular proportions of citric acid and ethenylethylenamidin, substantially as described.

2. As a new article of manufacture, the salt which may be formed by combining citric acid and ethenylethylenamidin, corresponding with the general formula:

Citric acid $(C_2H_4N_2H.C.CH_3)$ forming a white crystalline mass, soluble in water, fit for employment as medicine in cases of uric acid concretions and rheumatism, substantially as described.

In testimony whereof I have signed my name in the presence of two subscribing witnesses.

ALBRECHT SCHMIDT.

Witnesses:
W. HAUPT,
CHAS. KRIEGER.